(12) United States Patent
Mahmood et al.

(10) Patent No.: US 10,782,857 B2
(45) Date of Patent: *Sep. 22, 2020

(54) ADAPTIVE USER INTERFACE

(71) Applicant: Workday, Inc., Pleasanton, CA (US)

(72) Inventors: Omer Mahmood, Pleasanton, CA (US);
Khurram Mahmood, Walnut Creek, CA (US); Daniel Beaulne, Danville, CA (US); Brent Velthoen, Danville, CA (US); Matthew Grippo, Oakland, CA (US)

(73) Assignee: Workday, Inc., Pleasanton, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 15/658,183

(22) Filed: Jul. 24, 2017

(65) Prior Publication Data

US 2018/0024713 A1    Jan. 25, 2018

Related U.S. Application Data

(63) Continuation of application No. 13/793,897, filed on Mar. 11, 2013, now Pat. No. 9,747,005.

(51) Int. Cl.
| | |
|---|---|
| *G06F 3/00* | (2006.01) |
| *G06F 3/048* | (2013.01) |
| *G06F 17/00* | (2019.01) |
| *G06F 3/0484* | (2013.01) |
| *G06F 3/0481* | (2013.01) |
| *G06F 16/957* | (2019.01) |
| *G09G 5/00* | (2006.01) |

(52) U.S. Cl.
CPC .......... *G06F 3/0484* (2013.01); *G06F 3/0481* (2013.01); *G06F 16/9577* (2019.01); *G09G 5/00* (2013.01); *G09G 2340/145* (2013.01)

(58) Field of Classification Search
CPC .......... G06F 1/163; G06F 8/38; G06F 3/0481; G06F 3/011
See application file for complete search history.

(56) References Cited

U.S. PATENT DOCUMENTS

| | | | |
|---|---|---|---|
| 5,999,948 A * | 12/1999 | Nelson | ................ H04L 41/0213 715/207 |
| 7,631,296 B2 | 12/2009 | Seshadri | |
| 7,996,000 B1 | 8/2011 | Dubinko | |
| 8,847,894 B1 * | 9/2014 | Lee | ........................ G06F 1/1643 178/18.01 |
| 2004/0073873 A1 | 4/2004 | Croney | |
| 2005/0149862 A1 | 7/2005 | Weitzman | |
| 2006/0015846 A1 | 1/2006 | Fraleigh | |
| 2007/0038934 A1 * | 2/2007 | Fellman | ................ G06F 3/0481 715/700 |

(Continued)

*Primary Examiner* — Shourjo Dasgupta
(74) *Attorney, Agent, or Firm* — Van Pelt, Yi & James LLP (57) ABSTRACT

A system for determining display information comprises an interface and a processor. The interface is configured to receive widget information. A processor is configured to determine display information based at least in part on the widget information and display system information. Determining display information comprises determining a first subset of widget information to not display, determining a second subset of widget information to modify, and determining a third subset of widget information to display.

16 Claims, 11 Drawing Sheets

(56) References Cited

U.S. PATENT DOCUMENTS

| | | | |
|---|---|---|---|
| 2008/0120129 A1* | 5/2008 | Seubert | G06Q 10/10 |
| | | | 705/35 |
| 2008/0195951 A1 | 8/2008 | Oshiro | |
| 2008/0222232 A1 | 9/2008 | Allen | |
| 2009/0249359 A1 | 10/2009 | Caunter | |
| 2010/0257196 A1* | 10/2010 | Waters | G06F 3/0481 |
| | | | 707/769 |
| 2010/0262927 A1* | 10/2010 | Mamouni | H04M 1/72544 |
| | | | 715/764 |
| 2011/0016000 A1* | 1/2011 | Cronshaw | G06Q 30/02 |
| | | | 705/14.55 |
| 2011/0060994 A1* | 3/2011 | Maxwell | G06F 3/147 |
| | | | 715/730 |
| 2012/0137227 A1 | 5/2012 | Gerken, III | |
| 2012/0173963 A1 | 7/2012 | Hoke | |
| 2013/0086481 A1* | 4/2013 | Balasaygun | G06F 3/0481 |
| | | | 715/745 |
| 2013/0145306 A1 | 6/2013 | Shore | |
| 2013/0179836 A1 | 7/2013 | Han | |
| 2013/0249950 A1* | 9/2013 | Mahmoud | G06F 3/0488 |
| | | | 345/660 |
| 2013/0304570 A1 | 11/2013 | Johnson | |
| 2014/0101263 A1 | 4/2014 | Wu | |

\* cited by examiner

Desktop Computer Display

| Company | Last Trade | Trade Time | Change | Prev Close | Open | 1Y Target |
|---|---|---|---|---|---|---|
| GOOG | 597.74 | 12:12PM | 14.81 (2.54%) | 582.93 | 597.95 | 731.10 |
| AAPL | 378.94 | 12:22PM | 5.74 (1.54%) | 373.20 | 381.02 | 505.94 |
| AMZN | 191.55 | 12:23PM | 3.16 (1.68%) | 188.39 | 194.99 | 240.32 |
| ORCL | 31.15 | 12:05PM | 1.41 (4.72%) | 29.74 | 30.01 | 39.15 |
| MSFT | 25.50 | 12:19PM | 0.66 (2.67%) | 24.84 | 24.74 | 33.65 |
| CSCO | 18.65 | 11:55AM | 0.97 (5.49%) | 17.68 | 18.56 | 21.22 |
| YHOO | 15.81 | 12:22PM | 0.11 (0.67%) | 15.70 | 15.50 | 19.10 |

Fig. 4A

Tablet Computer Display

| Company | Last Trade | Change |
|---------|-----------|--------|
| GOOG | 597.74 | 14.81 (2.54%) |
| AAPL | 378.94 | 5.74 (1.54%) |
| AMZN | 191.55 | 3.16 (1.68%) |
| ORCL | 31.15 | 1.41 (4.72%) |
| MSFT | 25.50 | 0.66 (2.67%) |
| CSCO | 18.65 | 0.97 (5.49%) |
| YHOO | 15.81 | 0.11 (0.67%) |

# ADAPTIVE USER INTERFACE

CROSS REFERENCE TO OTHER APPLICATIONS

This application is a continuation of co-pending U.S. patent application Ser. No. 13/793,897, entitled ADAPTIVE USER INTERFACE filed Mar. 11, 2013 which is incorporated herein by reference for all purposes.

BACKGROUND OF THE INVENTION

Technologies for building business software applications typically utilize custom software to build a business process, to build a user interface, and to connect the business process to the user interface. This process allows for highly specialized software to be built, however, it is at a high cost. Modern computers come in a wide variety of form factors, requiring the software to be redesigned for each individual device. This greatly increases the manpower required for software development, as every new application requires custom versions for each of a large number of devices. It would be much better if a single version of the application could be executed and displayed correctly on many kinds of devices, regardless of their differences.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining display information is disclosed. The system for determining display information comprises an interface configured to receive widget information and a processor configured to determine display information based at least in part on the widget information and display system information; wherein determining display information comprises determining a first subset of widget information to not display; determining a second subset of widget information to modify; and determining a third subset of widget information to display. The system for determining display information additionally comprises a memory coupled to the processor and configured to provide the processor with instructions.

An adaptive user interface is disclosed. A system for executing a business process with an adaptive user interface comprises a presentation server for executing a business process based on a plurality of widget descriptions. When an application developer writes an application, he writes it as a set of widget descriptions. Each widget is chosen from a widget library and comprises a certain functionality and user interface. Widgets can be combined in any appropriate way. The presentation server receives the set of widget descriptions and instantiates the application accordingly. Computing devices comprise specific versions of the presentation server that instantiate an application from a set of widget descriptions in a manner specific to the computing device. Typically the widget functionality is unchanged across computing devices but the corresponding user interface is modified as appropriate. For instance, a user interface object might be rendered with large icons on a presentation server for a desktop computer and with small icons on a presentation server for a mobile phone. A spreadsheet might be displayed with more columns by a presentation server for a desktop computer, with fewer columns by a presentation server for a tablet computer, and with an interactive interface for navigating the spreadsheet on a mobile phone. Included as part of the widget descriptions are display hints from the application developer. Display hints are included to aid the presentation server in making content-based decisions regarding the display. For instance, a developer might indicate the three most important columns of a spreadsheet, so that a device with a small display size knows those are the three to display, rather than having to choose arbitrarily; or a developer might indicate an alternate widget type to convert a widget to for a device with a touch screen rather than a keyboard.

Figure 1:
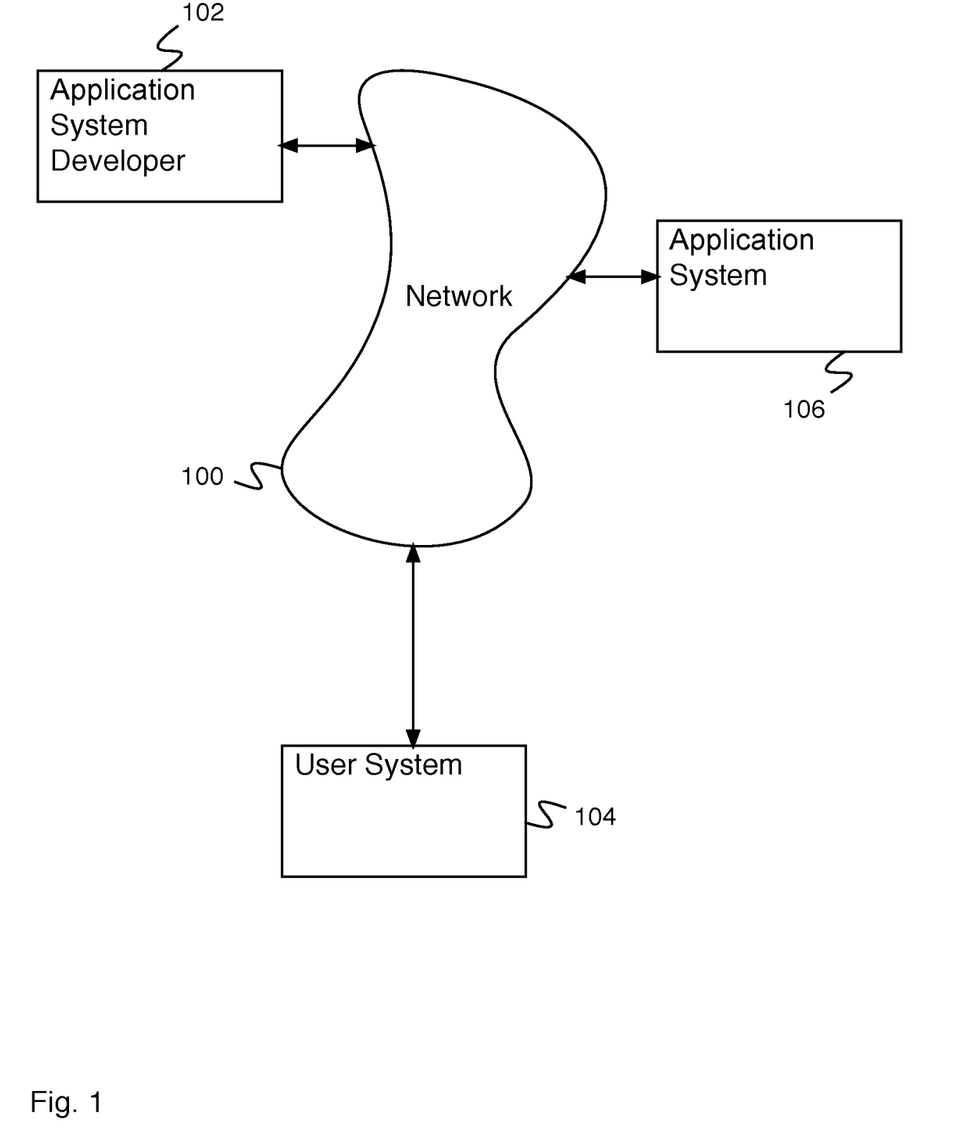
FIG. 1 is a block diagram illustrating an embodiment of a network system.

FIG. 1 is a block diagram illustrating an embodiment of a network system. In the example shown, the network system comprises application system developer 102, user system 104, and application system 106, communicating via network 100. In various embodiments, network 100 comprises one or more of the following: a local area network, a wide area network, a wired network, a wireless network, the Internet, or any other appropriate network. Application system 106 comprises an application system. In some embodiments, the application system comprises a human resource system. In some embodiments, application system 106 comprises a system for analysis of information. In some embodiments, application system 106 comprises a distributed system, e.g., a system comprising multiple computers not necessarily in the same location. In some embodiments, application system 106 comprises a system for executing business processes. In some embodiments, application system 106 comprises a system for an adaptive user interface.

Application system developer 102 comprises an application system developer developing software running on application system 106 or user system 104. In some embodiments, application system developer 102 comprises an employee at a company developing application system services. In some embodiments, developing application system 106 comprises creating, preparing, configuring, or modifying application system 106 as desired by application system users (e.g., a user using user system 104). User system 104 comprises a user system used by an application user accessing application services on application system 106. In some embodiments, a user using user system 104 comprises a user who uses a user interface (e.g., a keyboard, a touch screen, a display, a voice recognition system etc.) to interact with application system 106. In various embodiments, the user interface is associated with a desktop computer, a laptop computer, a local terminal, a smartphone, a tablet computer, or any other appropriate system with a user interface. In some embodiments, a user using user system 104 comprises an employee at a company purchasing database system services. In various embodiments, there are 1, 2, 4, 13, 22, 115, or any other appropriate number of application system users accessing application services on application system 106. In some embodiments, many different operating systems are used by the various user systems accessing application system 106 (e.g., Microsoft™ Windows™, Apple™ Macintosh™ OS, Apple iOS™, Android™ etc.). In some embodiments, many different device form factors are used by the various user systems accessing application system 106 (e.g., small smartphone, large smartphone, small tablet, large tablet, netbook computer, laptop computer, large laptop computer, desktop computer, etc.). In some embodiments, each application system user only has access to their own data stored on application system 106 and is able to utilize application system 106 as though they are the sole application system user. In some embodiments, a user using user system 104 configures services on application system 106. In some embodiments, the ability of application system user 104 to configure application system 106 is limited compared with that of application system developer 102. In some embodiments, an application system user (e.g., a user using user system 104) comprises a person accessing application system 106 via a user interface, e.g., a web page. In some embodiments, an application system user comprises an automated system accessing application system 106 via a machine interface, e.g., a public application programming interface (API).

Figure 2:
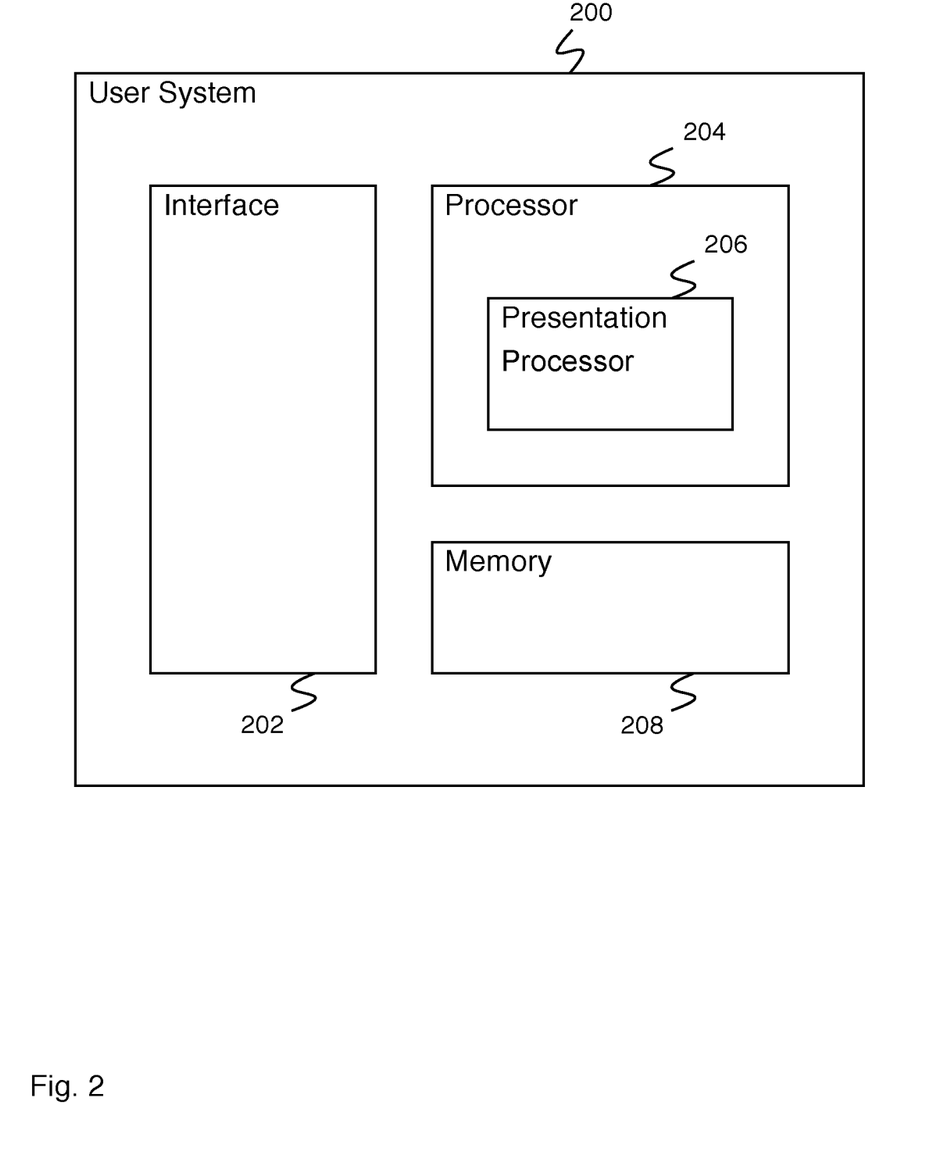
FIG. 2 is a block diagram illustrating an embodiment of a user system.

FIG. 2 is a block diagram illustrating an embodiment of a user system. In some embodiments, user system 200 of FIG. 2 comprises user system 104 of FIG. 1. In some embodiments, user system 200 comprises a system for an application system user to interact with an application system. In the example shown, user system 200 comprises interface 202, processor 204, and memory 208. In some embodiments, interface 202 comprises an interface for sending and receiving application system information to and from an application system via a network. In some embodiments, interface 202 additionally comprises a user interface for interacting with a user. In some embodiments, interface 202 is configured to receive widget information. In some embodiments, widget information is stored in memory 208 and processed by processor 204. Processor 204 comprises presentation processor 206. Presentation processor 206 comprises a presentation processor for processing widget information, determining display information based on the widget information and display system information, and providing display information to a user interface. In some embodiments, presentation processor 206 is able to adapt the widget information to provide a display appropriate to the operating system and form factor of user system 200. In various embodiments, adapting the widget information comprises determining how to render a widget, determining a first subset of widget information to not display, determining a second subset of widget information to modify, determining a third subset of widget information to display, or adapting the widget information in any other appropriate way. In some embodiments, widget information includes one or more hints to help presentation processor 206 adapt the widget information in the most appropriate manner.

Figure 3:
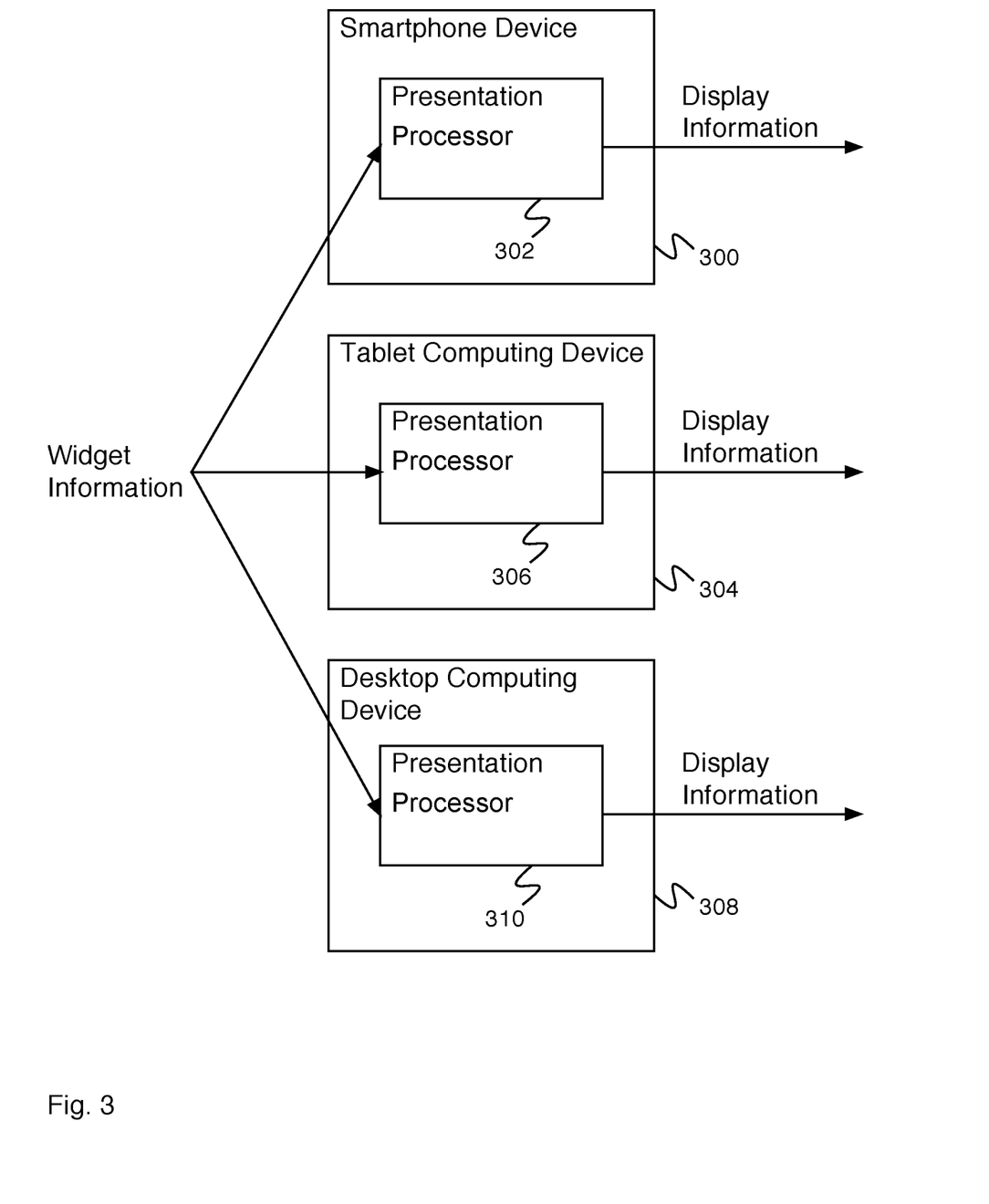
FIG. 3 is a block diagram illustrating an embodiment of a set of user systems.

FIG. 3 is a block diagram illustrating an embodiment of a set of user systems. In some embodiments, smartphone device 300, tablet device 304, and desktop computing device 308 each comprise user systems (e.g., user system 200 of FIG. 2). Smartphone device 300 comprises presentation processor 302, tablet computing device 304 comprises presentation processor 306, and desktop computing device 308 comprises presentation processor 310. Presentation processor 302, presentation processor 306, and presentation processor 310 each comprise presentation processors for receiving widget information and producing display information. However, presentation processor 302, presentation processor 306, and presentation processor 310 are customized to produce display information appropriate for their associated device and operating system, and can be very different software programs that produce very different display information as output. In the example shown, each presentation processor receives the same widget information and produces its own display information, customized to the associated device.

Figure 4A:
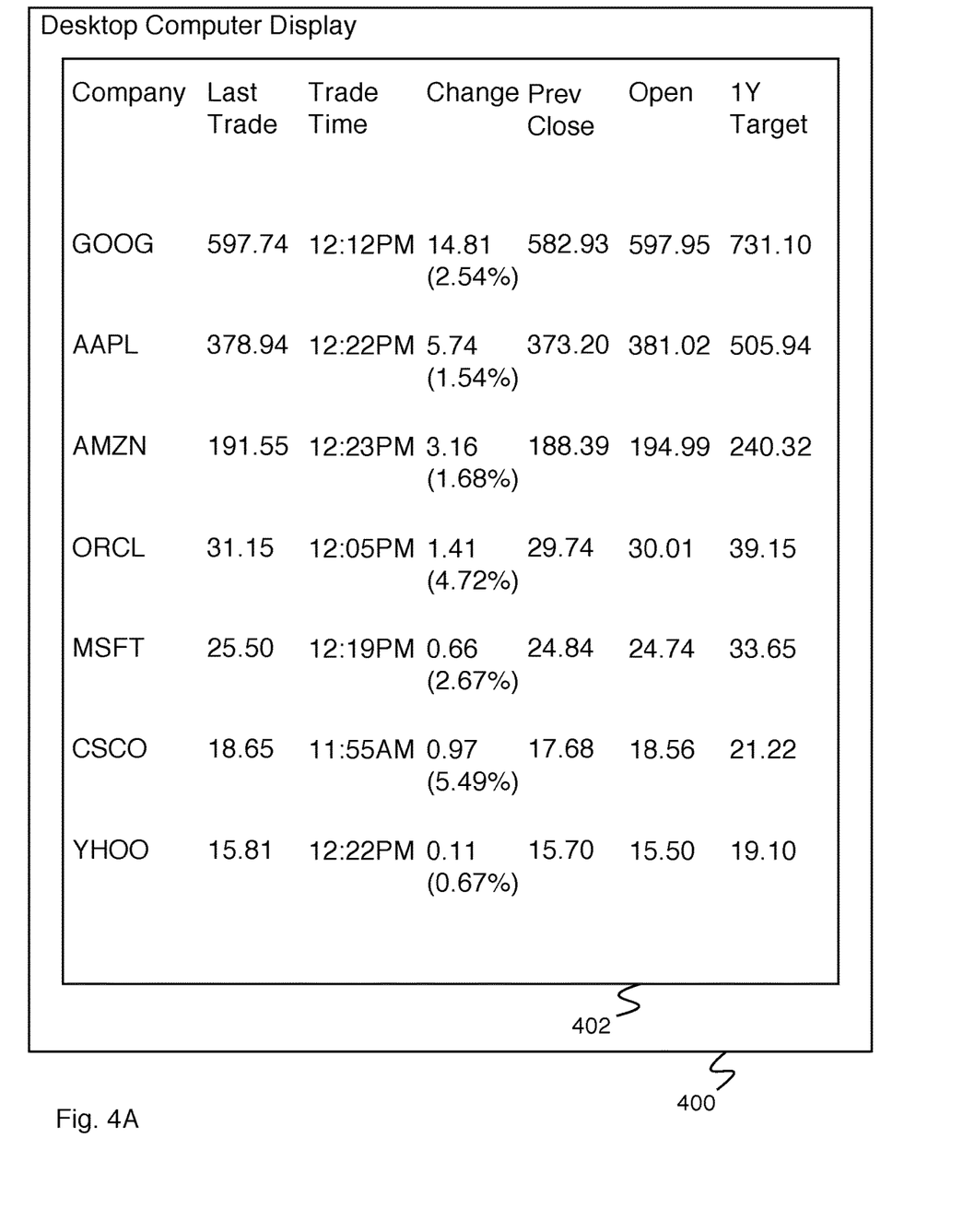
FIG. 4A is a diagram illustrating an embodiment of a spreadsheet display associated with a desktop computing device.

FIG. 4A is a diagram illustrating an embodiment of a spreadsheet display associated with a desktop computing device. In some embodiments, desktop computer display 400 comprises a display associated with desktop computing device 308 of FIG. 3. In the example shown, desktop computer display 400 displays spreadsheet 402. In some embodiments, spreadsheet 402 is generated by a presentation processor from widget information. In some embodiments, a spreadsheet widget comprises a grid widget. Spreadsheet 402 comprises data describing stock market data. Spreadsheet 402 comprises a large number of columns of data (e.g., "Company", "Last Trade", "Trade Time", "Change", "Prev Close", "Open", "1Y Target") of varying importance, wherein the importance of a column is not necessarily associated with the position of the column (e.g., the most important column is "Company", the second most important column is "Change", etc.).

Figure 4B:
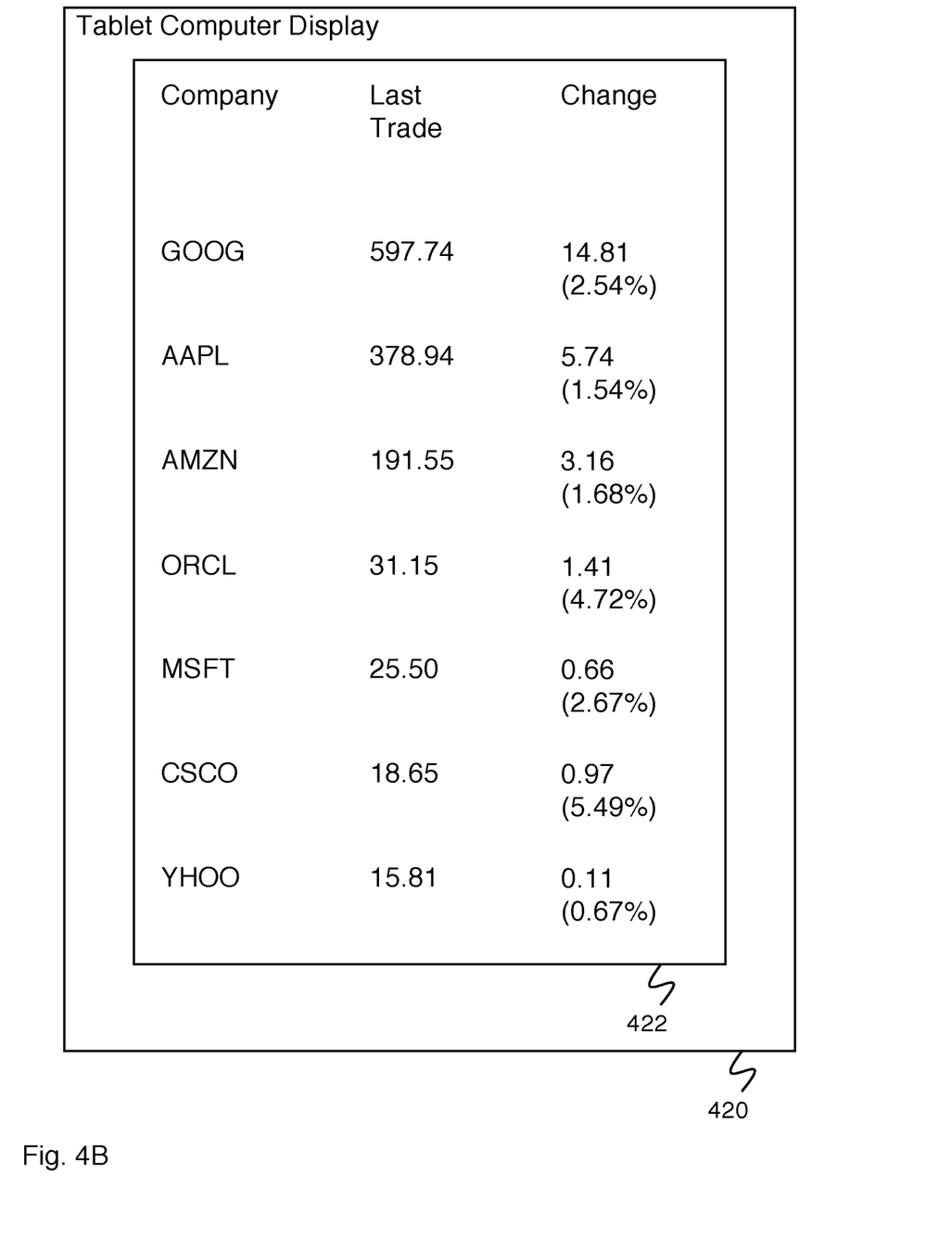
FIG. 4B is a diagram illustrating an embodiment of a spreadsheet display associated with a tablet computing device.

FIG. 4B is a diagram illustrating an embodiment of a spreadsheet display associated with a tablet computing device. In some embodiments, tablet computer display 420 comprises a display associated with tablet computing device 304 of FIG. 3. In the example shown, tablet computer display 420 displays spreadsheet 422. In some embodiments, spreadsheet 422 is generated by a presentation processor from widget information. In some embodiments, spreadsheet 422 is generated by a presentation processor from the same widget information as spreadsheet 402 of FIG. 4A. Spreadsheet 422 comprises data describing stock market data. Tablet computer display 420 does not have enough screen area to display all the stock market data (e.g., all the stock market data shown in spreadsheet 402 of FIG. 4A), so a subset of columns of data is shown. In various embodiments, the leftmost columns are shown, the rightmost columns are shown, a randomly chosen set of columns are shown, the most important columns are shown, the least important columns are not shown, or the set of columns shown are determined in any other appropriate way. In some embodiments, the most important columns are indicated by a hint included with the widget information. In some embodiments, the least important columns are indicated by a hint included with the widget information.

Figure 4C:
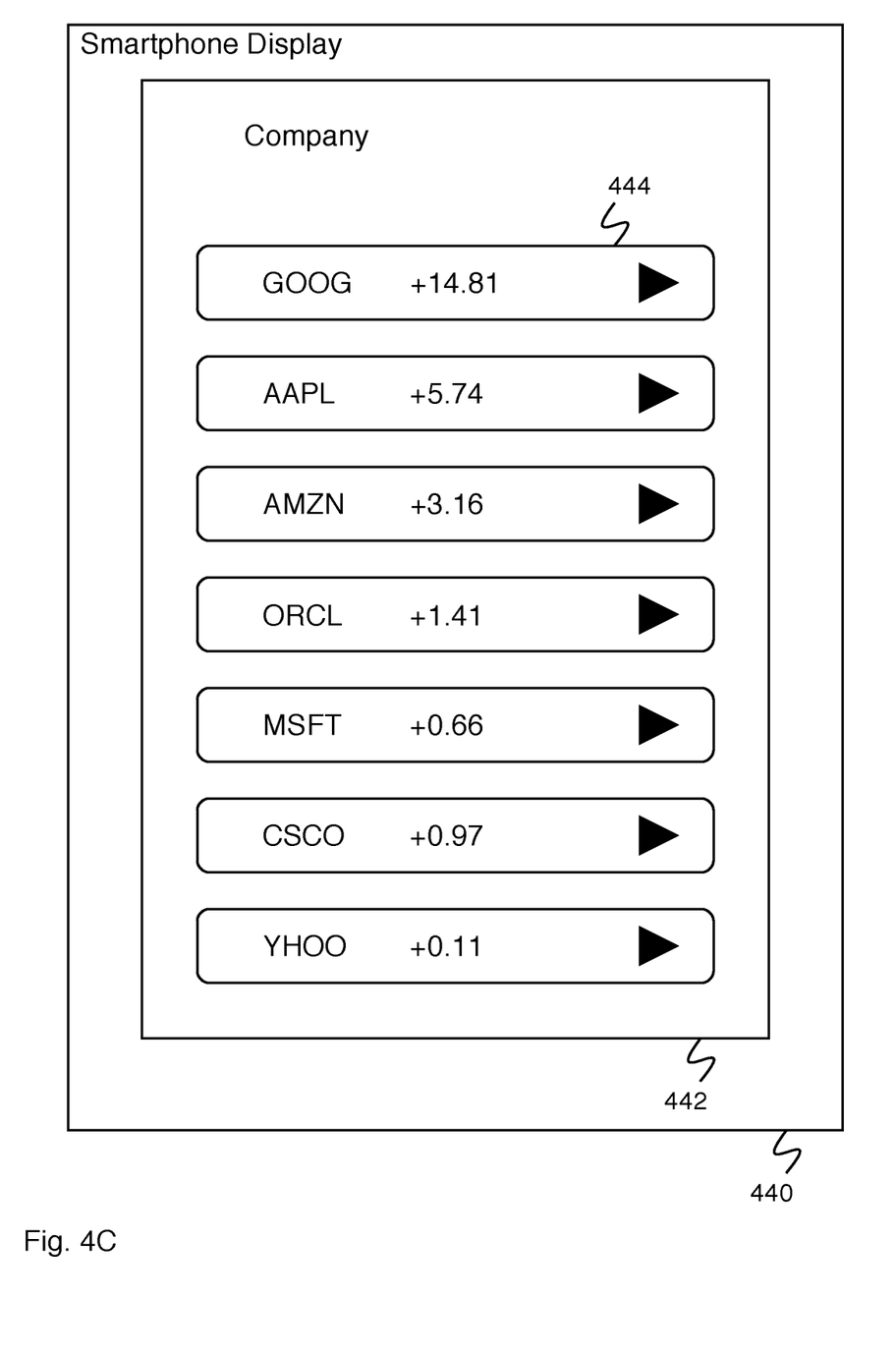
FIG. 4C is a diagram illustrating an embodiment of a form display associated with a smartphone device.

FIG. 4C is a diagram illustrating an embodiment of a form display associated with a smartphone device. In some embodiments, smartphone display 440 comprises a display associated with smartphone device 300 of FIG. 3. In the example shown, smartphone display 440 displays form 442. In some embodiments, form 442 is generated by a presentation processor from widget information. In some embodiments, form 442 is generated by a presentation processor from the same widget information as spreadsheet 402 of FIG. 4A. Form 442 comprises data describing stock market data. Smartphone display 420 does not have enough screen area to display all the stock market data (e.g., all the stock market data shown in spreadsheet 402 of FIG. 4A), or a useful subset of the data (e.g., the subset of the stock market data shown in spreadsheet 422 of FIG. 4B) so the data is displayed as a navigable form. In some embodiments, in the event that a smartphone does not have enough screen area to display a spreadsheet, the data is displayed as a list. Form 442 comprises a button associated with each row of spreadsheet data. Spreadsheet data for each column associated with a given row is accessed by making an indication to the button associated with the row. In some embodiments, the widget information includes a hint that the spreadsheet data should be displayed as a form if the display is below a certain size. In some embodiments, the widget information includes both a hint that the spreadsheet data should be displayed as a form if the display is below a certain size and a hint indicating the most important columns, and the presentation processor determines the correct display information to generate (e.g., for devices of a first size, show all columns; for devices of a second size, show some columns; for devices of a third size, show as form). In some embodiments, in the event a user makes an indication to GOOG button 444 (e.g., a tap), the user is taken to a form data display.

Figure 4D:
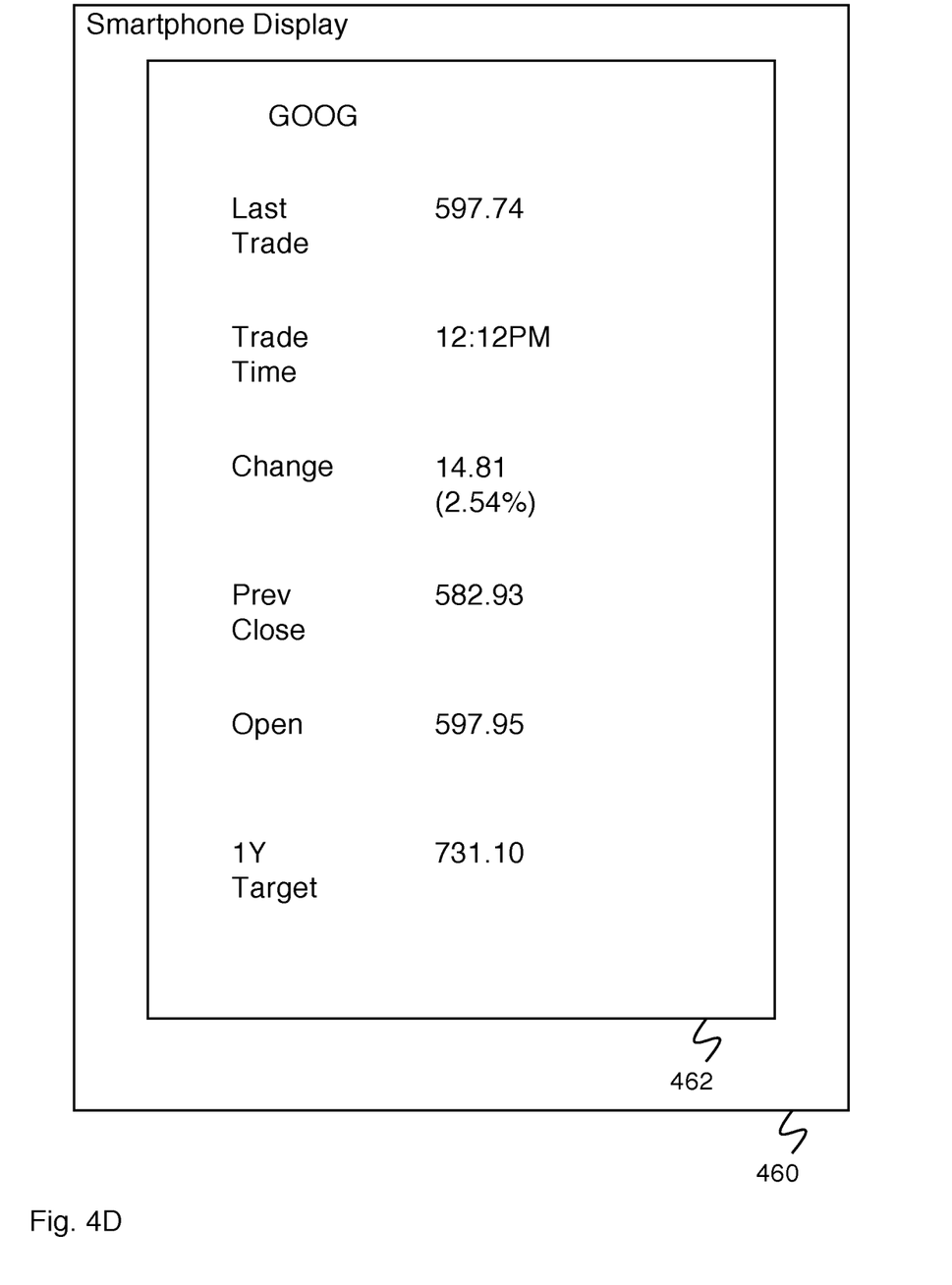
FIG. 4D is a diagram illustrating an embodiment of a form data display associated with a smartphone device.

FIG. 4D is a diagram illustrating an embodiment of a form data display associated with a smartphone device. In some embodiments, smartphone display 460 comprises a display associated with smartphone device 300 of FIG. 3. In the example shown, smartphone display 460 displays form data 462. Form data 462 comprises stock market data associated with GOOG. In some embodiments, form data 462 comprises spreadsheet data for each column associated with the row labeled GOOG.

Figure 5:
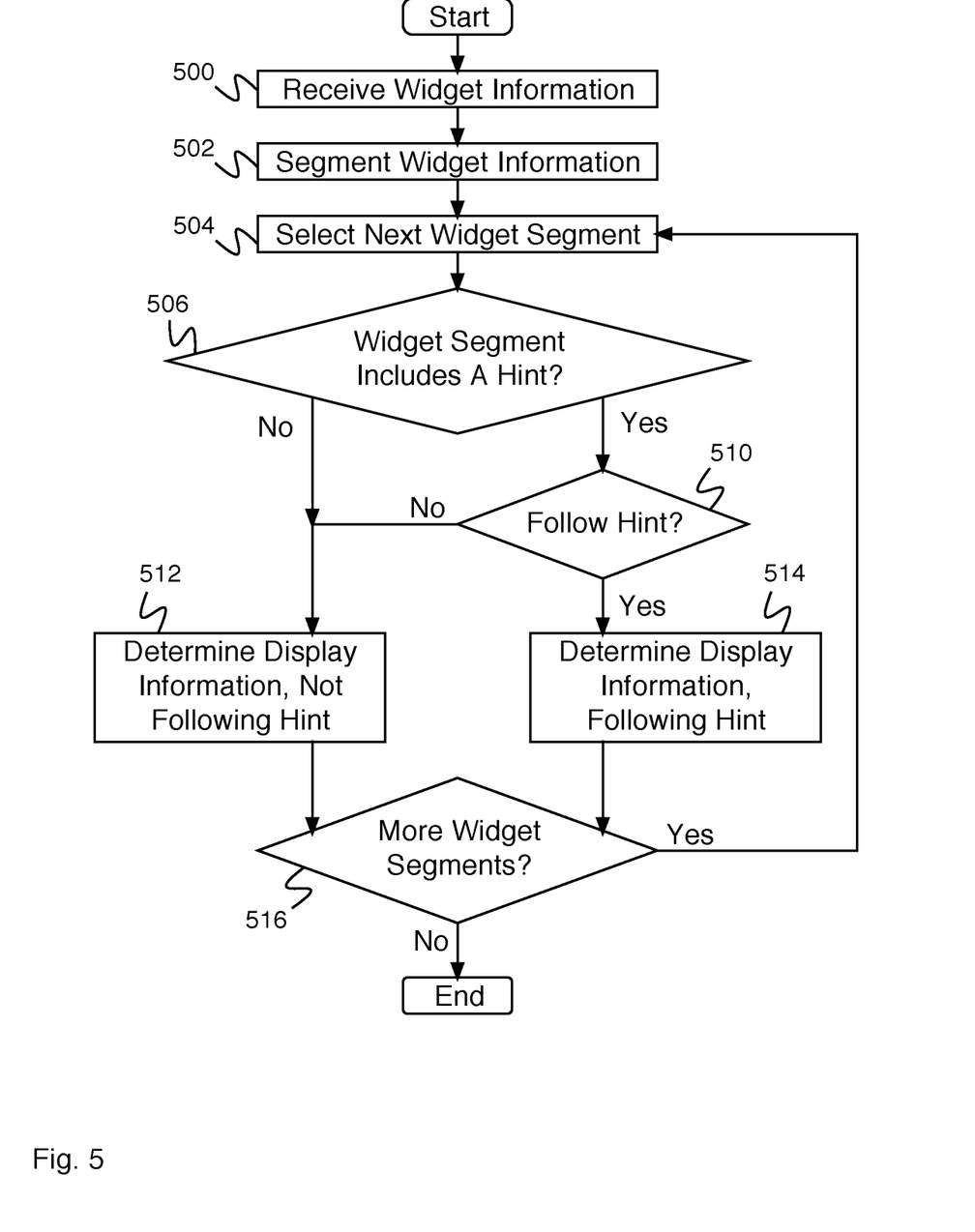
FIG. 5 is a flow diagram illustrating an embodiment of a process for determining display information from widget information.

FIG. 5 is a flow diagram illustrating an embodiment of a process for determining display information from widget information. In some embodiments, the process of FIG. 5 is executed by a presentation processor (e.g., presentation processor 206 of FIG. 2). In the example shown, widget information is received. In 502, widget information is segmented. In various embodiments, widget information is segmented into groups of widgets, into individual widgets, into parts of widgets, or into any other appropriate widget segments. In 504, the next widget segment is selected. In some embodiments, the next widget segment comprises the first widget segment. In 506, it is determined whether the widget segment includes a hint. In various embodiments, a hint is indicated by a markup tag, a hint declaration, a hint keyword, or is indicated in the widget information in any other appropriate way. If it is determined in 506 that the widget segment does not include a hint, control passes to 512. If it is determined in 506 that the widget segment includes a hint, control passes to 510. In 510, it is determined whether to follow the hint. In some embodiments, the hint includes conditions for use (e.g., the hint is to be followed if the device is phone, the hint is to be followed if the computing device is older with low memory and processing power, etc.). In some embodiments, the hint does not include conditions for use. In various embodiments, it is determined whether to follow the hint by using a heuristic for the widget type and device type, by attempting to build the display information and determining whether data needs to be hidden, by estimating the rendered display size and determining whether data needs to be hidden, or it is determined whether to follow the hint in any other appropriate way. If it is determined to follow the hint, control passes to 514. In 514, display information is determined, following the hint. Control then passes to 516. If it is determined in 510 not to follow the hint, control passes to 512. In 512, display information is determined, not following the hint. Control then passes to 516. In 516 it is determined whether there are more widget segments. If it is determined that there are more widget segments, control passes to 504. If it is determined that there are not more widget segments, the process ends.

Figure 6A:
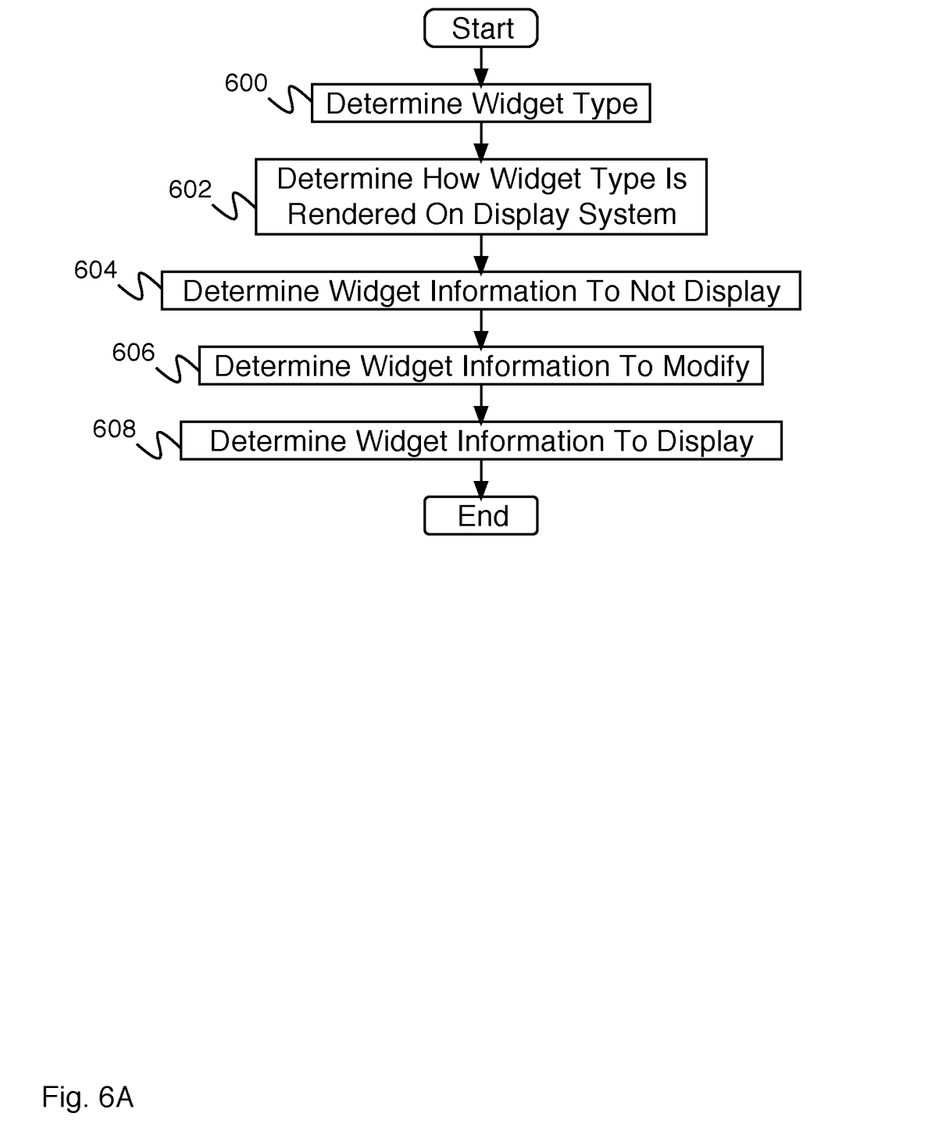
FIG. 6A is a flow diagram illustrating an embodiment of a process for determining display information, not following a hint.

FIG. 6A is a flow diagram illustrating an embodiment of a process for determining display information, not following a hint. In some embodiments, the process of FIG. 6A implements 512 of FIG. 5. In the example shown, in 600, the widget type is determined. In various embodiments, the widget type is indicated by a widget type markup tag, a widget type declaration, a widget type keyword, or is indicated in the widget information in any other appropriate way. In 602, it is determined how the widget type is rendered on the display system. In some embodiments, how the widget type is rendered on the display system is programmed directly into the presentation processor (e.g., presentation processor 206 of FIG. 2). In some embodiments, how the widget type is rendered on the display system is programmed differently into presentation processors on different systems. In 604, widget information to not display is determined. In various embodiments, widget information to not display comprises widget information that does not fit on the display, widget information that is irrelevant, widget information that is not necessary, widget information intended for a different device type, widget information to be summarized until a user wants to see it, or any other appropriate widget information to not display. In 606, widget information to modify is determined. In various embodiments, widget information to modify comprises widget information that does not fit as received, widget information with extra precision, widget information that can be displayed more appropriately with a different widget type, widget information that should be rearranged, widget information only displayed in case of certain gestures, widget information positioning to match device operating system user interface behavior, or any other appropriate widget information to modify. In 608, widget information to display is determined. In some embodiments, widget information to display comprises widget information that can be displayed appropriately as received.

Figure 6B:
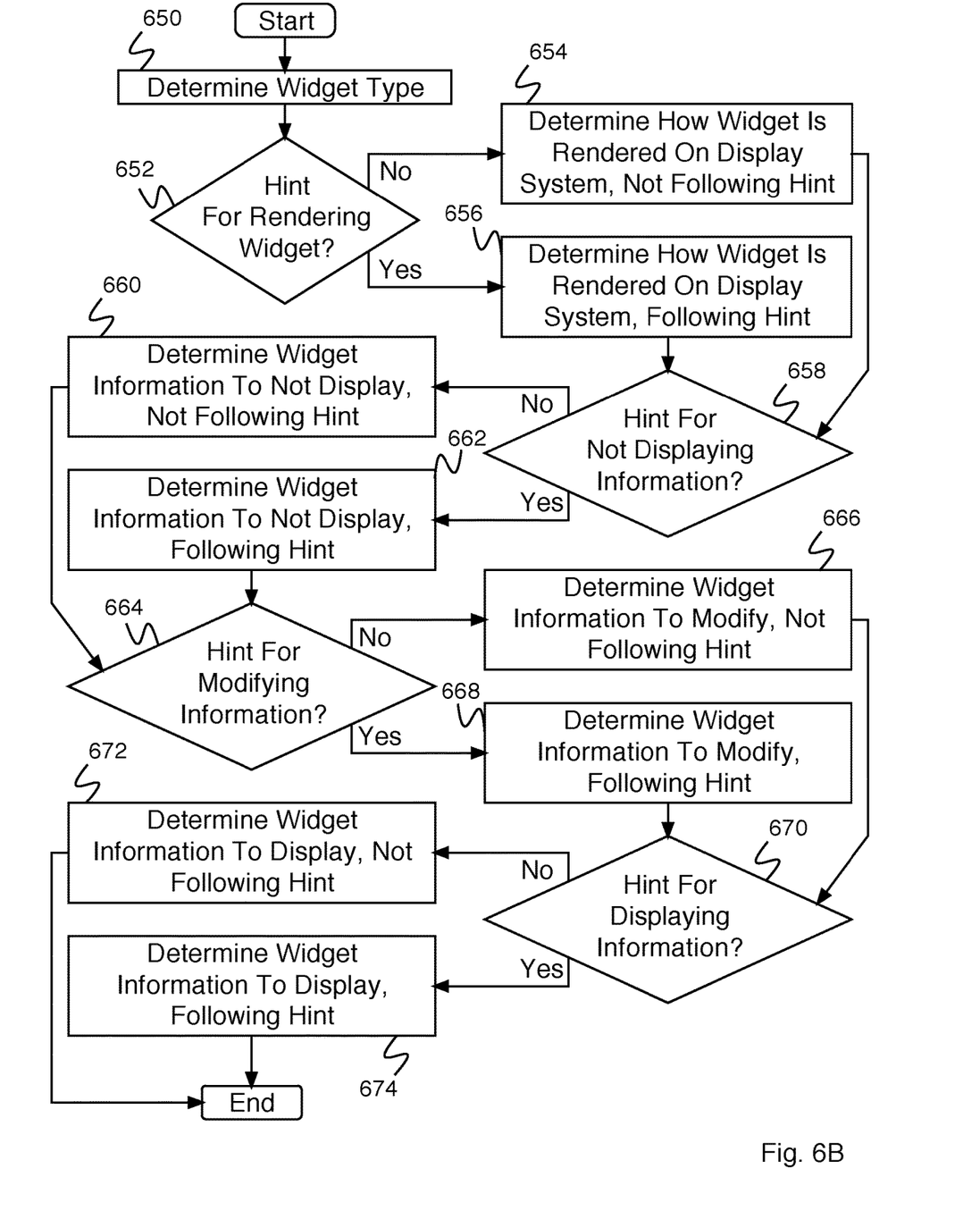
FIG. 6B is a flow diagram illustrating an embodiment of a process for determining display information, following a hint.

FIG. 6B is a flow diagram illustrating an embodiment of a process for determining display information, following a hint. In some embodiments, the process of FIG. 6A implements 514 of FIG. 5. In the example shown, in 650, the widget type is determined. In various embodiments, the widget type is indicated by a widget type markup tag, a widget type declaration, a widget type keyword, or is indicated in the widget information in any other appropriate way. In 652, it is determined whether a hint is for rendering the widget. If it is determined that the hint is not for rendering the widget, control passes to 654. In 654, it is determined how the widget is rendered on the display system, not following the hint. Control then passes to 658. If it is determined in 652 that the hint is for rendering the widget, control passes to 656. In 656, it is determined how the widget is rendered on the display system, following the hint. In various embodiments, the hint indicates what widget should be rendered, widget display settings, widget size settings, widget placement on screen or any other appropriate widget display information. Control then passes to 658. In 658, it is determined whether the hint is for not displaying information. If it is determined that the hint is not for not displaying information, control passes to 660. In 660, widget information to not display is determined, not following a hint. Control then passes to 664. If it is determined in 658 that the hint is for not displaying information, control passes to 662. In 662, widget information to not display is determined, following the hint. In various embodiments, the hint indicates information to not display on a small display, information to not display on a touchscreen display, low priority information, a not important column, or any other appropriate information to not display. Control then passes to 664. In 664, it is determined whether the hint is for modifying information. If it is determined that the hint is not for modifying information, control passes to 666. In 666, widget information to modify is determined, not following a hint. Control then passes to 670. If it is determined in 664 that the hint is for modifying information, control passes to 668. In 668, widget information to modify is determined, following the hint. In some embodiments, the hint indicates how widget information is to be modified. In various embodiments, the hint indicates information to modify on a small display, information to modify on a touchscreen display, information that can be collapsed, that a grid widget is to be displayed as a form widget, that a grid widget is to be displayed as a list widget, information that can grouped or any other appropriate information to modify. Control then passes to 670. In 670, it is determined whether the hint is for displaying information. If it is determined that the hint is not for displaying information, control passes to 672. In 672, widget information to display is determined, not following a hint. The process then ends. If it is determined in 670 that the hint is for displaying information, control passes to 674. In 674, widget information to display is determined, following the hint. In various embodiments, the hint indicates information to display on a small display, information to display on a touchscreen display, high priority information, an important column, widgets to display in a group or any other appropriate information to display.

Figure 7:
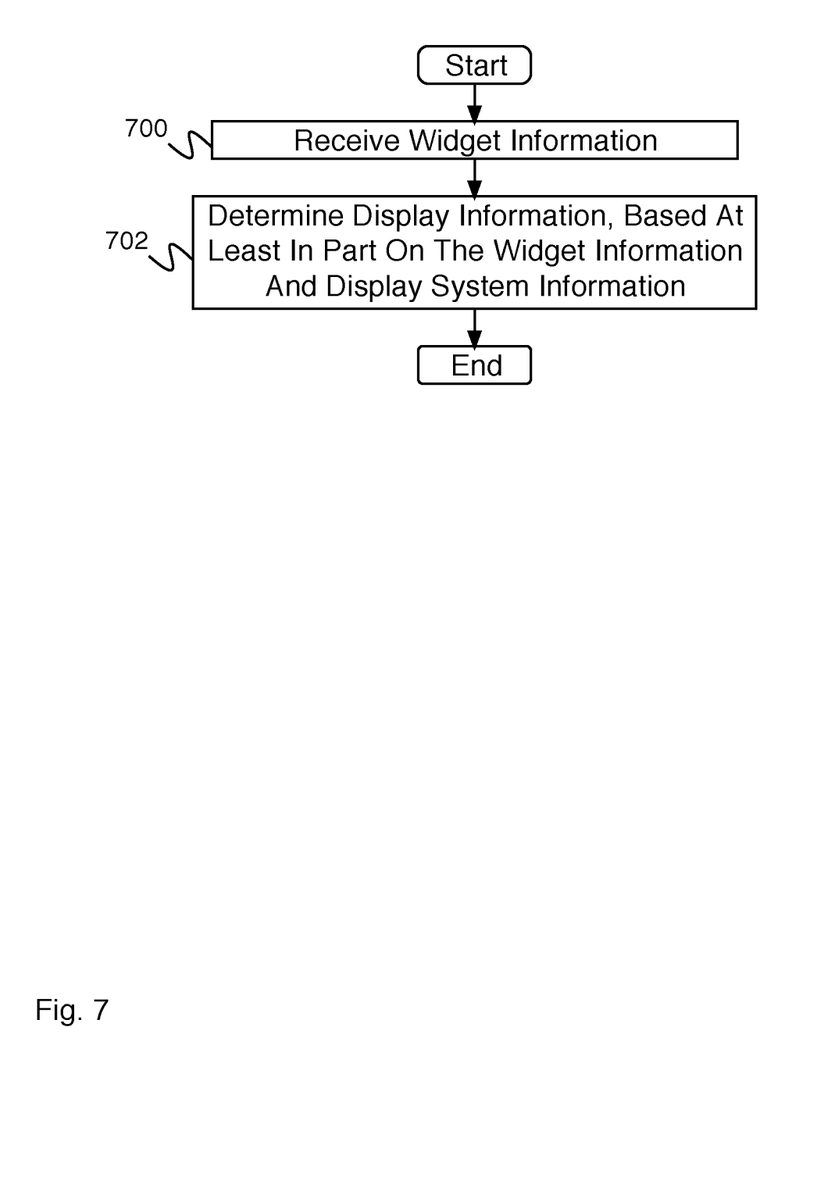
FIG. 7 is a flow diagram illustrating an embodiment of a process for determining display information.

FIG. 7 is a flow diagram illustrating an embodiment of a process for determining display information. In some embodiments, the process of FIG. 7 is executed by a user system (e.g., user system 200 of FIG. 2). In the example shown, in 700, widget information is received. In 702, display information is determined based at least in part on the widget information and display system information. In some embodiments, display information is determined using a processor. In some embodiments, determining display information comprises determining a first subset of widget information to not display, determining a second subset of display information to modify, and determining a third subset of display information to display.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining display information, comprising:
   a client device with a display;
   an interface configured to receive widget information, wherein the widget information includes a hint;
   a processor; and
   a memory coupled with the processor, wherein the memory is configured to provide the processor with instructions which when executed cause the processor to:
      determine display information based at least in part on the widget information and display system information, wherein determining display information comprises to:
         determine a first subset of widget information to not display based on the hint;
         determine a second subset of widget information to modify based on the hint, wherein the second subset includes an amount of precision, wherein the amount of precision corresponds to a number of digits that are used to express a value, and wherein the determining of the second subset comprises to:
            determine a type for the client device, the type for the client device including a desktop computer, a tablet computer, or a mobile phone; and
            modify the second subset of widget information based on the client device corresponds to a first type or a second type, and wherein the first type is different from the second type; and
         determine a third subset of widget information to display based on the hint.

2. A system as in claim 1, wherein determining display information comprises not following the hint.

3. A system as in claim 1, wherein the hint indicates widget information to not display.

4. A system as in claim 3, wherein the hint indicates a not important column.

5. A system as in claim 1, wherein the hint indicates widget information to display.

6. A system as in claim 5, wherein the hint indicates an important column.

7. A system as in claim 1, wherein the hint indicates widget information to modify.

8. A system as in claim 7, wherein the hint indicates how widget information is to be modified.

9. A system as in claim 7, wherein the hint indicates a grid widget is to be displayed as a form widget.

10. A system as in claim 7, wherein the hint indicates a grid widget is to be displayed as a list widget.

11. A method for determining display information, comprising:
   receiving widget information, wherein the widget information includes a hint; and
   determining, using a processor, display information based at least in part on the widget information and display system information, wherein determining display information comprises:
   determining a first subset of widget information to not display based on the hint;
   determining a second subset of widget information to modify based on the hint, wherein the second subset includes an amount of precision, wherein the amount of precision corresponds to a number of digits that are used to express a value, and wherein the determining of the second subset of widget information to modify comprises:
      determining a type for a client device, the type for the client device including a desktop computer, a tablet computer, or a mobile phone; and
      modifying the second subset of widget information based on the client device corresponds to a first type or a second type, and wherein the first type is different from the second type; and
   determining a third subset of widget information to display based on the hint.

12. A method as in claim 11, wherein widget information includes a hint.

13. A method as in claim 12, wherein determining display information comprises following the hint.

14. A method as in claim 12, wherein determining display information comprises not following the hint.

15. A method as in claim 12, further comprising determining whether to follow the hint.

16. A computer program product for determining display information, the computer program product being embodied in a tangible non-transitory computer readable storage medium and comprising computer instructions for:
   receiving widget information, wherein the widget information includes a hint; and
   determining, using a processor, display information based at least in part on the widget information and display system information, wherein determining display information comprises:
   determining a first subset of widget information to not display based on the hint;
   determining a second subset of widget information to modify based on the hint, wherein the second subset includes an amount of precision, wherein the amount of precision corresponds to a number of digits that are used to express a value, and wherein the determining of the second subset of widget information to modify comprises:
      determining a type for a client device, the type for the client device including a desktop computer, a tablet computer, or a mobile phone; and
      modifying the second subset of widget information based on the client device corresponds to a first type or a second type, and wherein the first type is different from the second type; and
   determining a third subset of widget information to display based on the hint.

\* \* \* \* \*